Figure 1:
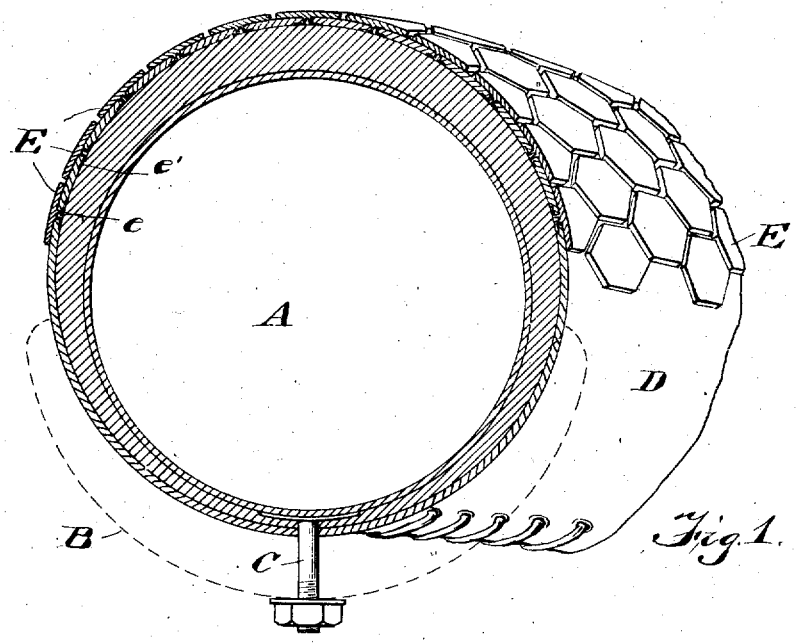

H. R. PALMER.

PROTECTOR FOR RUBBER TIRES.

APPLICATION FILED JAN. 6, 1905.

Reissued Nov. 23, 1909. 13,045.

WITNESSES:

Robert Head

V. E. Nichols

INVENTOR:

Herbert R. Palmer,

BY

Griffin & Bernhard

ATTORNEYS

UNITED STATES PATENT OFFICE.

HERBERT R. PALMER, OF CLEVELAND, OHIO, ASSIGNOR, BY MESNE ASSIGNMENTS, TO FREDERICK E. McEWEN.

PROTECTOR FOR RUBBER TIRES.

13,045. Specification of Reissued Letters Patent. Reissued Nov. 23, 1909.

Original No. 717,263, dated December 30, 1902, Serial No. 110,510. Application for reissue filed January 6, 1905. Serial No. 239,908.

*To all whom it may concern:*

Be it known that I, HERBERT R. PALMER, a citizen of the United States, residing at Cleveland, in the county of Cuyahoga and State of Ohio, have invented a certain new and useful Improvement in Protectors for Rubber Tires, of which the following is a full, clear, and exact description, reference being had to the accompanying drawings.

The object of the invention is to provide a simple and efficient protective covering for the rubber tires of vehicles and primarily for the pneumatic tires of automobiles. I have two purposes in view, first, to reduce the continual wear of the tire from its ordinary abrasion, and, second, to eliminate puncturing of it.

The depreciating in an automobile-tire from its ordinary wear is a very great item of expense, amounting frequently to more than the cost of the fuel for running the vehicle and being sometimes as high in a single season as ten or fifteen per cent. of the original cost of the vehicle. The depreciation from puncture is not so great, for the tires as now constructed are very thick on their tread. Nevertheless, pieces of metal or glass are frequently encountered which give a sufficient gash to the tire to puncture it. Now in overcoming these difficulties of continual wear and occasional puncturing I have invented a covering consisting of a series of individual metal plates carried by a suitable flexible backing and located close together, but not overlapping. These plates are individually small and are placed in staggered position, the result being that they receive all the wear from abrasion by the road without interfering with the flexibility of the tire, and although there are between the plates spaces of rubber not completely covered, these spaces, owing to the staggering of the plates, are of such zigzag form that it is impossible for any large piece of metal or glass to come in contact with the rubber, and anything which is small enough to project between the plates will not materially injure the tire.

I am aware that it has been proposed heretofore to protect tires by metal overlapping scales held about them; but such overlapping scales are not efficient, because they interfere with the flexibility of the tire. The upper portion of the tire is always substantially circular in cross-section, owing to the interior air-pressure, while the lower portion is very much flattened by supporting the weight, and thus there is a continuous bending in and out of the tread of the tire. This bending causes any overlapping scales to continually wear the tire and to become themselves so displaced that they may badly rupture it.

My invention consists, broadly, of non-overlapping hard plates carried by a flexible backing and more particularly of such plates placed in a staggered position. I find that by making the plates in the form of hexagons they may substantially abut without overlapping, and this is the preferable shape for these plates. Finally, I find that the plates may be carried by the flexible backing most simply by having the plates form the heads of rivets the shanks of which are upset on the inner side of the flexible backing, and my invention includes such an embodiment.

The preferred form of my invention is clearly illustrated in the drawings, in which—

Figure 2:
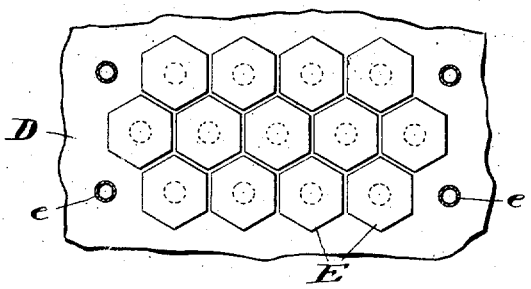
Figure 3:
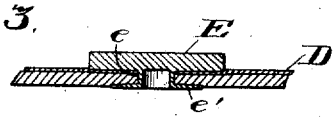
Figure 4:
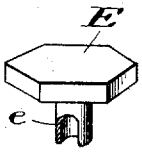

Figure 1 is a perspective view of a section of a pneumatic automobile-tire having my protecting-covering. Fig. 2 is a plan of a portion of such covering, some of the rivets being sectional through their shanks. Fig. 3 is an enlarged section through the covering. Fig. 4 is a perspective view of the rivet preferably employed, the shank being partly broken away.

Referring to the drawings by letters, A represents an ordinary pneumatic automobile-tire, and B (shown in dotted lines) the vehicle-rim. The tire is shown as held to the rim by bolts C, carried by the tire and extending through the rim. This is shown as simply illustrative, and any suitable form of tire may be associated with my invention.

D represents the flexible backing of my protecting-covering, which is preferably an outer tube of canvas faced with rubber. It may be slitted along the innermost periphery and laced to the outer tube or otherwise held in place.

The metal plates are indicated by E. As shown, they are regular hexagons, nearly, but not quite, abutting. They have shanks *e*, which extend through the fabric and are upset on the inner surface thereof, as at *e'*.

The shank is preferably tubular, so that it may be easily upset and so that on the inner side the upset portion will extend a considerable distance over the fabric, preventing any ripping thereof or jerking of the rivet loose from the fabric and doing away with the necessity of a washer.

It will be seen that at no point on such a protected tire could a long edge of metal, as the edge of a hoop, enter the tire, the longest continuous straight line of unprotected covering being substantially equal to one of the sides of the hexagon head of the rivets. At the same time these rivets do not in the least interfere with the flexibility of the tire or the cover. The upset shank is smooth enough on the inner side to do no harm to the tire, and all wear is transferred from the surface of the tire to that of the metal plates.

Having described my invention, I claim—

1. A protecting-covering for a vehicle-tire consisting of a flexible backing carrying flat-headed rivets whose heads are on the outer side of the backing and are in staggered position and nearly abut but do not overlap, and whose shanks extend through the backing and are upset on the inner side thereof, substantially as described.

2. A protecting-covering for a vehicle-tire consisting of a flexible backing carrying a series of rivets whose heads are on the outer side of the backing and consist of plane-surfaced plates bounded on straight lines, the plates being staggered in position but having their edges nearly abutting but not overlapping, substantially as described.

3. A protecting-covering for a vehicle-tire consisting of a flexible backing carrying numerous rivets whose heads are on the outer side of the backing and consist of plates and whose shanks are tubular and are upset on the inner side of the backing, substantially as described.

4. A protecting-covering for a vehicle-tire consisting of an outer tube of fabric carrying numerous flat headed rivets the heads of which are on the outer side of the fabric tube, the shanks of said rivets being upset on the inner side thereof, the rivets being placed in staggered position and the heads nearly abutting at their edges but not overlapping, substantially as described.

5. A protecting-covering for a vehicle-tire consisting of a flexible backing carrying numerous rivets whose heads are regular hexagons and whose shanks are tubular, the rivets being placed in staggered position with the heads on the outer side of the backing nearly abutting but not overlapping and the shanks being upset on the inner side of the backing, substantially as described.

6. As a new article of manufacture, a protector for rubber tires composed of flexible material separate from said tire and having means for securing said flexible material in fixed relation to a tire, the wearing surface of said flexible material being composed of plane surfaced heads of metallic rivets, the shanks of said rivets being secured individually to the flexible material.

7. As a new article of manufacture, a protector for rubber tires composed of flexible material faced with rubber and made separate from the tire, means for securing the flexible material in fixed relation to the tire, and a wearing surface composed of flat headed rivets fastened individually to the flexible material, said heads of the rivets being disposed in close relation to each other but not overlapping.

8. As a new article of manufacture, a protector for rubber tires consisting of flexible material adapted to be applied to an ordinary tire, said flexible material having metallic rivets with flat-heads secured thereto, the flat-heads of the rivets being on the outer surface of the flexible material, and means for securing said protector to a tire.

9. As a new article of manufacture, a protector for rubber tires consisting of flexible material adapted to be applied to an ordinary tire, said flexible material having metallic rivets with flat-heads secured thereto, the flat-heads of the rivets being in staggered relation to each other and disposed on the outer surface of the flexible material, and means for securing said protector to a tire.

In testimony whereof I have signed my name to this specification in the presence of two subscribing witnesses.

HERBERT R. PALMER.

Witnesses:

L. F. McAuley,

D. M. McAuley.